(12) United States Patent
Mao et al.

(10) Patent No.: US 10,778,075 B2
(45) Date of Patent: Sep. 15, 2020

(54) LINEAR VIBRATION MOTOR

(71) Applicant: AAC Technologies Pte. Ltd., Singapore (SG)

(72) Inventors: Lubin Mao, Shenzhen (CN); Yun Tang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 168 days.

(21) Appl. No.: 16/056,666

(22) Filed: Aug. 7, 2018

(65) Prior Publication Data

US 2019/0157958 A1 May 23, 2019

(30) Foreign Application Priority Data

Nov. 17, 2017 (CN) .................... 2017 2 1548021 U

(51) Int. Cl.
*H02K 33/12* (2006.01)
(52) U.S. Cl.
CPC ......... *H02K 33/12* (2013.01); *H02K 2201/18* (2013.01)

(58) Field of Classification Search
CPC ..................... H02K 33/12; H02K 2201/18
See application file for complete search history.

(56) References Cited

U.S. PATENT DOCUMENTS

| 10,038,360 B2 * | 7/2018 | Wang | H02K 33/16 |
| 2017/0144191 A1 * | 5/2017 | Mao | B06B 1/045 |
| 2019/0207498 A1 * | 7/2019 | Mao | H02K 33/12 |

* cited by examiner

*Primary Examiner* — Dang D Le
(74) *Attorney, Agent, or Firm* — IPro, PLLC; Na Xu

(57) ABSTRACT

The present disclosure discloses a linear vibration motor. The linear vibration motor includes a base, a vibrating unit disposed in the base, an elastic member for suspending the vibrating unit in the base and a coil. The vibrating unit includes a mass block, a first magnet steel and a second magnet steel received in the mass block, there are two second magnet steels separately disposed on two opposite sides of the first magnet steel. The coil includes a first coil and a second coil that are insulated from each other, and the driving force generated by the first coil can drive the first magnet steel to vibrate along a first direction, while the driving force generated by the second coil can drive the second magnet steel to vibrate along a second direction, wherein the first direction is perpendicular to the second direction.

7 Claims, 2 Drawing Sheets

100

LINEAR VIBRATION MOTOR

FIELD OF THE PRESENT DISCLOSURE

The present disclosure relates to vibrator technologies, in particular to a linear vibration motor applicable to a portable electronic device.

DESCRIPTION OF RELATED ART

With the development of electronic technologies, portable electronic devices, such as mobile phones, handheld game players, portable multimedia players, or the like, become more and more popular. Portable electronic devices generally include vibrating motors for generating vibration feedback, and thus the vibrating motors are required to have high performance and long usage life.

The linear vibration motor currently used in portable consumer electronic product generally includes a base providing an accommodating space, a vibrating unit disposed in the base, an elastic member for suspending the vibrating unit in the accommodating space, and a coil fixed to the base. The magnetic field generated by the coil and the vibrating unit will drive the vibrating unit to vibrate.

In order to realize the bidirectional vibration of the single vibrating unit in the X-axis direction and the Y-axis direction of the flat, the vibrating unit comprises a mass block, a first magnet steel and a second magnet steel received in the mass block and spaced apart from each other, wherein the first magnet steel is located at the geometric center of the mass block; and the coil comprises a first coil and a second coil, the driving force generated by the first coil can drive the first magnet steel to vibrate along the X-axis direction, while the driving force generated by the second coil can drive the second magnet steel to vibrate along the Y-axis direction.

However, since the first magnet steel is located at the geometric center of the mass block and the second magnet steel is located at one end of the mass block, the structure makes the asymmetry of the vibrating unit and the uneven of the mass distribution. As a result, twisting is easily generated during the vibration of the vibrating unit, thereby affecting the vibration stability of the linear vibration motor.

Therefore, it is desired to provide a new linear vibration motor which can overcome the aforesaid problems.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
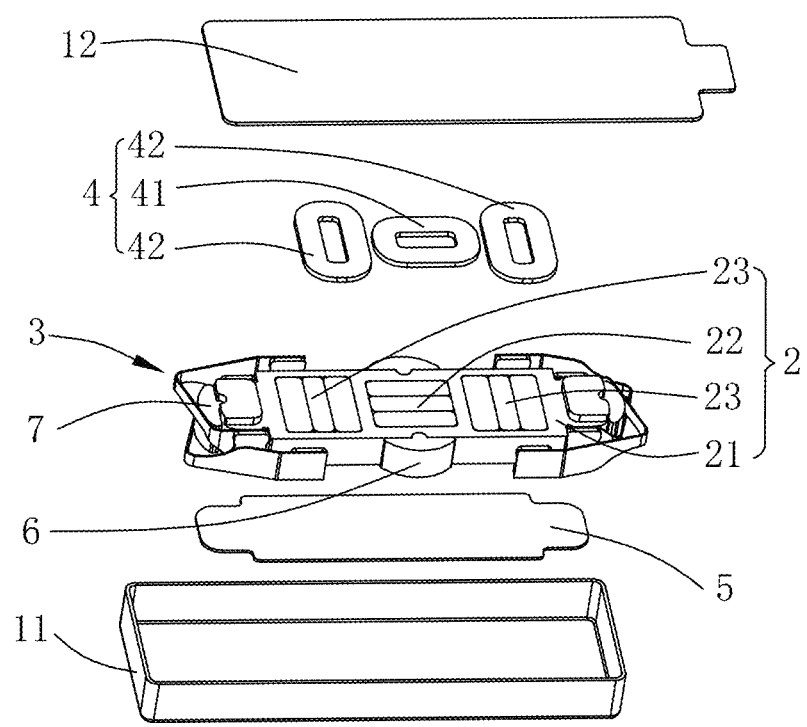
FIG. 1 is an exploded view of a vibration motor according to an embodiment of the present disclosure.
Figure 2:
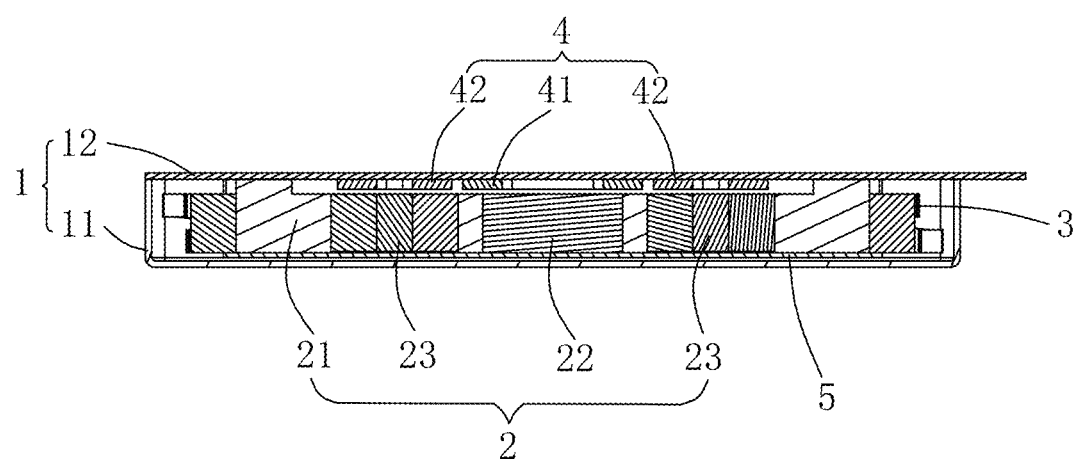
FIG. 2 is an cross-sectional view of the vibration motor of FIG. 1.

As referring to FIGS. 1-2, a linear vibration motor 100 comprises a base 1, a vibrating unit 2, an elastic member 3, a coil 4, a magnetic plate 5, a first buffer block 6 and a second buffer block 7. The base 1 provides an accommodation space 10. The vibrating unit 2 is suspended in the accommodation space 10 by the elastic member 3. The coil 4 is fixed to the base 1 for driving the vibrating unit 2.

In this embodiment, the base 1 comprises a shell 11 and a cover plate 12 that can enclose the accommodation space 10 with the shell 11. Of course, the shell 11 and the cover plate 12 may also have a unitary structure.

The vibrating unit 2 comprises a mass block 21, a first magnet steel 22 and a second magnet steel 23 received in the mass block 21. On one hand, the mass block 21 is used to fix the first magnet steel 22 and the second magnet steel 23, and on the other hand, it is used to increase the weight of the vibrating unit 2, so as to increase the vibration amplitude and improve the vibration effect of the vibrating unit 2. In this embodiment, there are two second magnet steels 23 separately disposed on two opposite sides of the first magnet steel 22. Preferably, the two second magnet steels 23 are disposed symmetrically with respect to the first magnet steel 22, it is beneficial to realize symmetrical structure and uniform mass distribution of the vibrating unit 2, and when the vibrating unit 2 vibrates, stability is better, and twisting is avoided.

In this embodiment, the elastic member 3 which can provide support and resilient restoring forces for the vibrating unit 13 has a first end connected to the mass block 21 and a second end connected to the shell 11 of the base 1.

The coil 4 which can drive the vibrating unit 2 fixed to the base 1. In this embodiment, the coil 4 is fixed to the cover plate 12 of the base 1. The coil 4 comprises a first coil 41 and a second coil 42 that are insulated from each other. The driving force generated by the first coil 41 can drive the first magnet steel 22 to vibrate along a first direction that is, the X-axis direction in the drawing, while the driving force generated by the second coil 42 can drive the second magnet steel 23 to vibrate along a second direction that is, the Y-axis direction in the drawing, wherein the first direction is perpendicular to the second direction. That is, the linear vibration motor 100 can provide double frequency resonance along two directions X-axis and Y-axis using one vibrating unit.

The vibrating unit 2 can provide double frequency resonance through the first magnet steel 22 and the second magnet steel 23 respectively, such as setting through a magnet structure, coil position setting, and the like. In this embodiment, the magnetization direction of the first magnet steel 22 is perpendicular to the magnetization direction of the second magnet steel 23. When the first coil 41 is energized, the first magnet steel 22 will vibrate along the X-axis direction. When the second coil 42 is energized, the second magnet steel 23 will vibrate along the Y-axis direction.

The magnetic plate 5 is fixed to one side of the mass block 21 away from of the cover plate 12. On one hand, the magnetic plate 5 is used to increase the weight of the vibrating unit 2 which can improve the vibration performance of the linear vibration motor 100, and on the other hand, it is used to guide the magnetic lines of the first magnet steel 22 and the second magnet steel 23, so as to reduce the loss of the magnetic lines and enhance the magnetic field performance, and further increase the vibration strength of the vibrating unit 2.

The first buffer block 6 is fixed to both sides of the mass block 21 in the first direction. The second buffer block 7 is fixed to both sides of the mass block 21 in the second direction. The first buffer block 6 and the second buffer block 7 are respectively used to prevent the vibrating unit 2 from colliding with the base 1 when it vibrates in the X-axis direction and the Y-axis direction to generate noise and improve the vibration performance.

Comparing to the prior art, the linear vibration motor provided by the present invention has a first magnet steel which can vibrate along the first direction and two second magnet steels which can vibrate along the second direction. The two second magnet steels are separately disposed on two opposite sides of the first magnet steel in the first direction, the structure of the vibrating unit is beneficial to structural symmetry and uniform mass distribution, so that the vibration stability of the linear vibration motor is better.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor, comprising a base providing an accommodation space, a vibrating unit disposed in the base, an elastic member for suspending the vibrating unit in the accommodation space, and a coil fixed to the base for driving the vibrating unit; wherein the vibrating unit comprises a mass block, a first magnet steel and a second magnet steel received in the mass block, there are two second magnet steels separately disposed on two opposite sides of the first magnet steel; the coil comprises a first coil and a second coil that are insulated from each other; the driving force generated by the first coil can drive the first magnet steel to vibrate along a first direction, while the driving force generated by the second coil can drive the second magnet steel to vibrate along a second direction, wherein the first direction is perpendicular to the second direction.

2. The linear vibration motor as described in claim 1, wherein the magnetization direction of the first magnet steel is perpendicular to the magnetization direction of the second magnet steel.

3. The linear vibration motor as described in claim 2, wherein the two second magnet steels are disposed symmetrically with respect to the first magnet steel.

4. The linear vibration motor as described in claim 3, wherein the base comprises a shell and a cover plate that can enclose the accommodation space with the shell, and the coil is fixed to the cover plate.

5. The linear vibration motor as described in claim 4, wherein the linear vibration motor further comprises a magnetic plate fixed to one side of the mass block away from of the cover plate.

6. The linear vibration motor as described in claim 3, wherein the linear vibration motor further comprises a first buffer block fixed to both sides of the mass block in the first direction.

7. The linear vibration motor as described in claim 6, wherein the linear vibration motor further comprises a second buffer block fixed to both sides of the mass block in the second direction.

\* \* \* \* \*